Oct. 11, 1955     P. M. BOURDON     2,720,240
WHEEL RIMS
Filed June 26, 1953     3 Sheets-Sheet 1
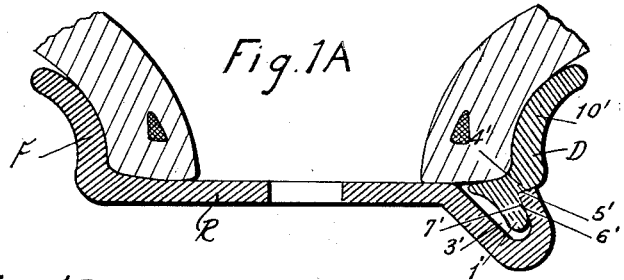
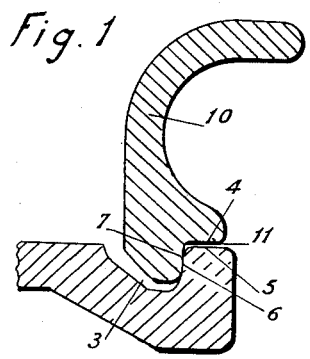
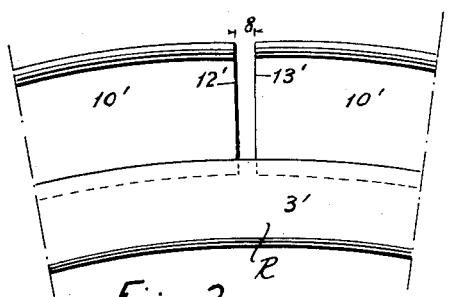
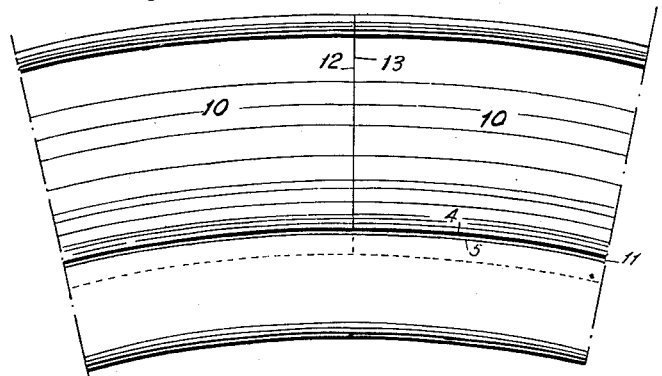
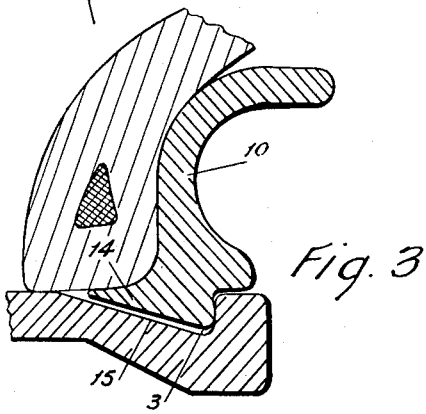
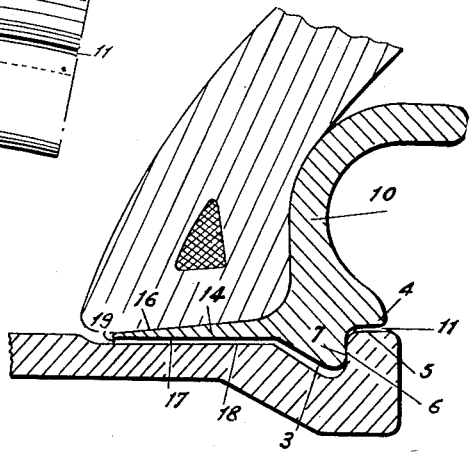
INVENTOR
PIERRE MARCEL BOURDON
by
his ATTORNEYS Oct. 11, 1955  P. M. BOURDON  2,720,240
WHEEL RIMS
Filed June 26, 1953  3 Sheets-Sheet 3

INVENTOR
PIERRE MARCEL BOURDON
by
Campbell Brumbaugh Free&Graves
his ATTORNEYS

United States Patent Office 2,720,240
Patented Oct. 11, 1955

2,720,240

WHEEL RIMS

Pierre Marcel Bourdon, Paris, France, assignor to Compagnie Generale des Etablissements Michelin, Clermont-Ferrand, France Application June 26, 1953, Serial No. 364,431

Claims priority, application France December 15, 1952

6 Claims. (Cl. 152—406)

The invention relates to wheel rims having a detachable flange. More particularly it is concerned with a wheel rim of the type in which the detachable flange comprises a split ring or circular cheek plate having an internally projecting annular portion adapted to engage a groove adjacent one edge of the rim, whilst another annular part supports the adjacent bead of the pneumatic tire.

One object of the invention is to obtain a wheel rim of this type in which the removal and replacement of the detachable flange is facilitated and in which this flange is held solid with the groove or recess in the rim.

Another object of the invention is to obtain a wheel rim in which the two ends of the split ring constituting the detachable flange firmly engage one against the other when the flange is in position thus eliminating entirely of reducing to a minimum the gap that frequently occurs and is capable of damaging the bead of the outer cover.

In order to explain the present invention, one method of construction of a wheel rim, having a detachable flange of the type at present in use, is shown in section in Figure 1A, Figure 1B being a side elevation.

Figures 1 and 2 are views corresponding to those of Figures 1A and 1B and show respectively a section and elevation of a detachable flange in accordance with the invention mounted in the groove of a wheel rim.

Figures 3 and 4 are sectional views showing the application of the invention to two alternative types of detachable flange.

Figure 5:
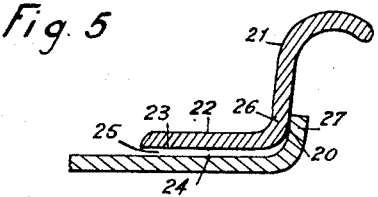
Figure 5 is a sectional view of the application of the invention to a particular construction of wheel rim and detachable flange thereof.

Referring first to Figures 1A and 1B, R indicates generally the wheel rim having a fixed flange F and a detachable flange D. In the base of the rim is a lateral groove 3 to receive the ring element 10' constituting the detachable flange.

In present day constructions, the diameter (when it is at rest) at the shoulder or part 4' of the ring element 10', which bears against the upper peripheral edge 5' of the groove 3' in the rim is less than the diameter of the edge 5'. The inter-engagement of shoulder 4' and the edge 5' is due first to the inherent elasticity of the metal of which the ring is formed and secondly to the pressure component from the tire acting against the bead which presses on the ring 10'. The detachable flange, as is recognised, also comprises a radial extension 1', the outer face 7' of which bears against the inside face 6' of the groove 3'.

With detachable flanges of this construction, when the flange is mounted and in position on the rim there is an appreciable gap 8 (Figure 1B) between the two ends 12' and 13' of the ring element 10'. This may cause serious inconvenience.

Due to the pressure set up by the tire, and the effect of the load which forms it and the various movements to which it is subjected when in use, the outer cover rubs against the edges 12' and 13' of the gap 8 and for this reason will deteriorate. Moreover, the ends 12' and 13' which are not positively held by the rim, or by reason of rubbing against each other, become relatively displaced under the action of the forces transmitted by the tire and thus further increase the extent of wear of the outer cover wall adjacent the gap 8. It is further recognized that any deterioration in the tire cover in the region in which it bears against the edges of the wheel rim is capable of having very serious consequences. This is a serious inconvenience, which it is the main object of the invention to overcome by eliminating the gap 8 between the ends 12' and 13'.

Up to now the technical experts have always considered that it was indispensable for the overall circumferential length of the part 4' to be less than that of the edge 5' of the rim groove, in such a manner as to permit of its tightening or closing, as explained above, with, the inevitable consequence of the creation of the gap 8.

Surprisingly, the inventors have discovered that it is possible to dispense with any tightening action between the parts 4' and 5' and, in consequence to eliminate the gap 8.

The invention consists in so designing the flange 4', which bears against the flange 5' of the groove 3', that its diameter (or length) when at rest is slightly greater than the diameter (or length) of the flange 5' of the groove 3'. This will ensure that the ends 12' and 13' of the ring 10' will bear tightly one against the other, once the ring 10' element has been placed in the groove 3' thereby overcoming the difficulties described above.

It should be understood that the invention can be applied to any wheel rim having a detachable flange consisting of a split resilient ring, whatever be the shape and/or construction of the wheel rim, the detachable flange and the corresponding section of the wheel rim.

Referring now to Figs. 1 and 2, it will be seen that since the diameter of the ring part 4 is slightly greater than the diameter of the ring part 5, when the flange 10 is in position and not subjected to pressure, there exists between the two rings a slight gap 11. There is thus nothing to prevent the flange 10 from closing on itself with the result that the ends 12 and 13 of this ring will abut one against the other with a force which is dependent upon the elasticity of the metal of the flange 10 and the pressure of the pneumatic tire and which can, in practice, attain a very high value. This force is such that the friction between the ends 12 and 13 will prevent their relative displacement. Moreover, when the interior surface of the flange 10 becomes sufficiently well worn adjacent the ends 12 and 13, this surface will be practically continuous and smooth, and there is no risk, in consequence, of damage to the outer cover which rests on it.

In Fig. 1 it will be seen that the pressure between the cylindrical surfaces 4 and 5 is eliminated. The detachable flange 10 is only supported by the groove where engagement occurs in the region of 6 and 7, but this engagement, it has been discovered, in practice, is hardly sufficient.

The detachable flange 10 may have any desirable form in transverse section. In Fig. 3 there is shown a flange comprising an extension 14 which provides a part or complete seating for the bead of the outer tire cover and which is located in a recess 3 having a correspondingly inclined part 15.

In the construction shown in Fig. 4 the extension 14 which provides a seating for the bead of the outer cover, is of known form itself: its outer surface 16 is conical, whilst its inner surface 17 is cylindrical. Such a construction is intended, as is known, to wedge the bead of the outer cover on the extension 14. This construction, also, provides a gap 11 between the edge 5 of the recess 3 and the corresponding part 4 of the detachable flange 10; but, besides, the surface 17 only just enters into contact with the corresponding cylindrical part 18 of the rim and these two surfaces are separated by a slight gap 19.

The inventors have ascertained, surprisingly, that the existence of the gaps 11 and 19 is of no importance and that the frictional pressure between the surfaces 6 and 7, which is increased by the pressure of the outer cover, is sufficient to prevent any rotation of the tire and of the flange 10 with respect to the fixed part of the wheel rim. In addition, the pressure of the bead of the outer cover resting on the other and fixed flange, which is symmetrical to the flange 10, and on that portion of the fixed flange symmetrical with the seating 16 is sufficient to prevent, by reason of the rigidity of the outer cover, any rotation of the bead which bears against the flange 10.

The invention is not only applicable to wheel rims in which the detachable ring is mounted in a groove or recess in the wheel rim. It is applicable in whatever manner the split detachable ring is supported by the wheel rim. By way of example Fig. 5 shows the application of the invention to a wheel rim in which the groove 3 in the rim is eliminated and replaced by a circular raised edge 20, adapted to receive a detachable flange element 21 which in section is of inverted L form and the horizontal limb 22 of which serves as a seating for the bead of the outer cover and which may be conical or cylindrical as well as the corresponding surface 24 of the rim.

According to the invention, the inner surface 23 of the horizontal limb 22 of the flange 21 has a circular development greater than that of the exterior surface 24 of the wheel rim. In consequence the meeting edges 12 and 13 are free to engage one against the other, when the ring is in position on the rim and a gap 25 separates the respective surfaces 24 and 23 of the wheel rim and detachable flange similar to the space 11 in the preceding examples. There is an annular area of contact at 26 between the flange 21 and the part 27 of the flange 20 of the rim which is sufficient in practice, as has been explained above, to maintain the ring 21 against rotation in relation to the wheel rim. In whatever manner the detachable flange is maintained on the wheel rim, the slit 12—13 of the detachable ring can be set at any angle with respect to the axis of the wheel rim. It may be straight, biased, sinusoidal or zig-zag. Figures 6 to 15 show several alternative forms of split.

Figure 6:
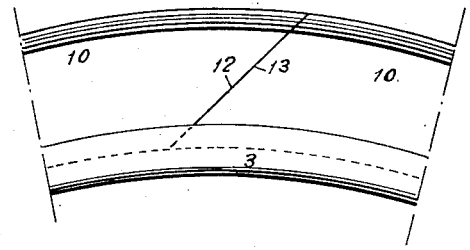
Figures 6–15 are diagrammatic views partly in elevation, illustrating various forms of ring slit or opening for wheel rims to which the invention is applicable.
Figure 7:
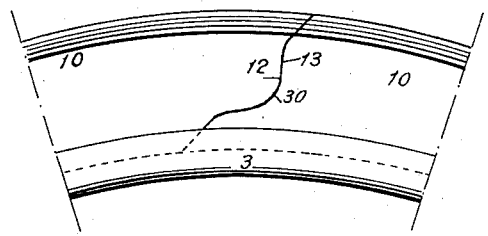
Figure 8:
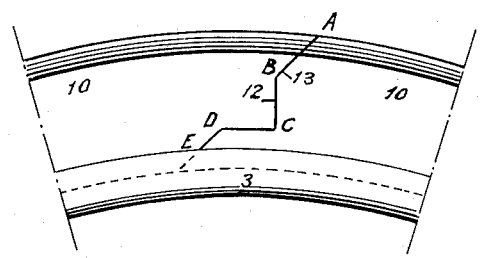
Figure 9:
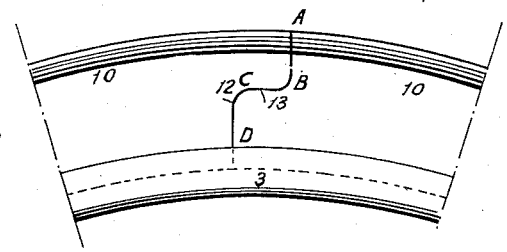

In Fig. 6 the slit 12—13 is oblique and straight, in Fig. 7 is oblique but includes a curved central part 30. In Fig. 8 there is an oblique part AB, a vertical part BC, a horizontal part CD and another oblique part DE. In Fig. 9 a horizontal part BC is comprised between two vertical parts AB, CD.

Figure 10:
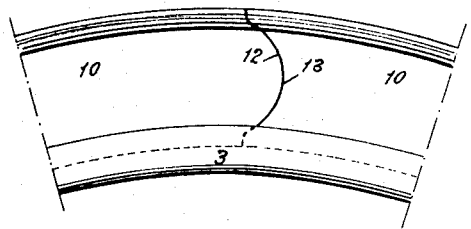

Fig. 10, the split 12—13 is semi-circular.

Figure 11:
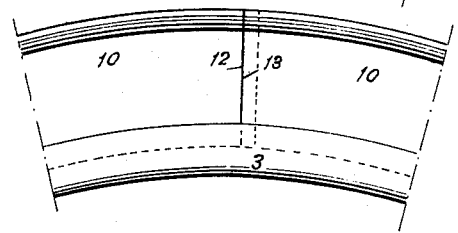

Fig. 11, the split 12—13 is rectilinear and vertical, but in plan it is oblique with respect to the plane of the figure.

Figure 12:
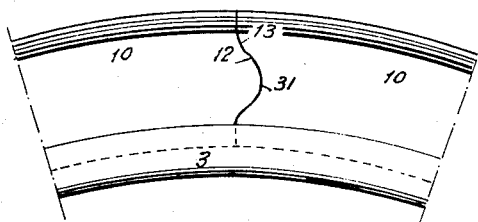
Figure 13:
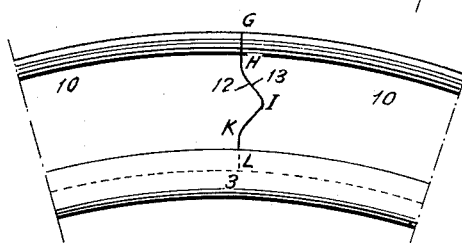
Figure 14:
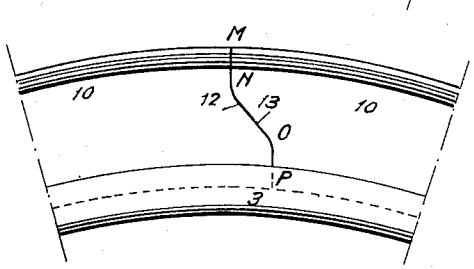

Fig. 12 shows an arrangement having a vertical slit with a curved centre part 31. In Fig. 13 it is vertical from G to H, oblique from H to I, oblique in an inverse sense from I to K and again vertical from K to L. Fig. 14, the slot is vertical from M to N, oblique from N to O, but vertical from O to P.

Figure 15:
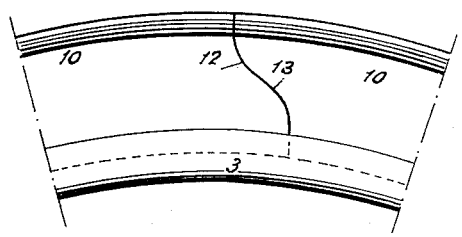

Fig. 15 shows a sinusoidal slot.

I claim:

1. A wheel rim for receiving a pneumatic tire, comprising an annular rim member, a split ring flange for engaging a tire bead, said flange being detachably mounted adjacent to one edge of the rim member, the flange having internal dimensions and contours such that the ends of the split ring flange are in engagement and the flange engages said rim loosely with capacity for limited radial movement, and means on said rim and said flange having lateral engaging surfaces to retain said flange on said rim.

2. A wheel rim for receiving a pneumatic tire, comprising an annular rim member having an outwardly directed edge portion, said edge portion having an inner side substantially normal to the axis of said ring member, a split, ring-like, bead-engaging flange detachably mounted on said rim member, said flange having a side face engageable with said inner side to retain said flange on said rim, said flange being resilient and having internal dimensions greater than the external dimensions of the portion of the rim behind said flange to allow the ends of the flange to engage and present a continuous surface for engagement with a tire when mounted on said rim member.

3. A wheel for receiving a pneumatic tire, comprising a rim having a raised edge on a marginal portion thereof, said edge having an inner side surface, a circumferential split flange having a portion engaging said inner side surface and engageable with the outer surface of a tire bead, said flange having an inner circumferential portion, a seat for said circumferential portion formed on a marginal portion of the rim inwardly of said raised edge, said split flange being resilient and being formed on a radius such that the ends of the split flange when in position on the rim are in contact and said flange presents a continuous surface to said outer surface of the tire bead said inner circumferential portion of the flange having an inner circumference exceeding that of the seat on the rim to enable said ends of said flange to come into engagement.

4. A wheel rim for receiving a pneumatic tire, comprising an annular rim member having an outwardly facing circumferential groove adjacent to its edge, a split, detachable flange ring having a rib to engage in said groove, a circumferential extension adjacent to said rib, and an outer flange portion to engage the bead of a tire, said groove having a circumferential seating edge coacting with said circumferential extension, the peripheral length of the inner surface of said circumferential extension of said split ring being substantially greater than that of said seating edge and the split ring being formed on a radius such that the ends of the split ring are in engagement when the ring is on the rim member so that said ring presents a continuous surface to the bead of the pneumatic tire.

5. The wheel rim set forth in claim 1, in which the ends of said split ring flange have at least a portion thereof inclined non-radially of said flange.

6. The wheel rim set forth in claim 1, in which the ends of said split ring flange have complemental interfitting projections and recesses thereon.

References Cited in the file of this patent

UNITED STATES PATENTS

| | | |
|---|---|---|
| 1,499,739 | Klaus | July 1, 1924 |
| 1,507,671 | Greene | Sept. 9, 1924 |
| 1,627,369 | Baker | May 3, 1927 |
| 2,021,240 | Main | Nov. 19, 1935 |
| 2,381,963 | Anderson | Aug. 14, 1945 |